(12) United States Patent  
Mellet et al.

(10) Patent No.: US 8,715,130 B2
(45) Date of Patent: *May 6, 2014

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US); Andrew W. Phillips, Rochester, MI (US)

(73) Assignee: GM Global Technology Operations, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,894

(22) Filed: May 14, 2013

(65) Prior Publication Data

US 2013/0310210 A1    Nov. 21, 2013

Related U.S. Application Data

(60) Provisional application No. 61/649,659, filed on May 21, 2012.

(51) Int. Cl.
 *F16H 3/62*    (2006.01)

(52) U.S. Cl.
 USPC ............................ 475/277; 475/280; 475/903

(58) Field of Classification Search
 USPC ........................... 475/275–277, 280, 288, 903
 See application file for complete search history.

(56) References Cited

U.S. PATENT DOCUMENTS

| 6,960,149 | B2 * | 11/2005 | Ziemer | 475/276 |
| 6,991,578 | B2 | 1/2006 | Ziemer | |
| 7,018,319 | B2 | 3/2006 | Ziemer | |
| 8,277,355 | B2 * | 10/2012 | Hart et al. | 475/282 |
| 8,343,005 | B2 * | 1/2013 | Hart et al. | 475/276 |
| 8,343,007 | B2 * | 1/2013 | Hart et al. | 475/288 |
| 2013/0137544 | A1 * | 5/2013 | Mellet et al. | 475/276 |

* cited by examiner

*Primary Examiner* — Justin Holmes

(57) ABSTRACT

A transmission has an input member, an output member, four planetary gear sets, a plurality of coupling members and a plurality of torque transmitting devices. Two of the four planetary gear sets are stacked. Two of the planetary gear sets include first, second and third members. The two planetary gear sets that are stacked form a planetary gear set assembly that includes a first, second, third and fourth member. The torque transmitting devices include clutches and brakes.

19 Claims, 2 Drawing Sheets

| GEAR STATE | GEAR RATIO | RATIO STEP | TORQUE TRANSMITTING ELEMENTS ||||||
|---|---|---|---|---|---|---|---|---|
| | | | 36 | 34 | 32 | 28 | 26 | 30 |
| REV | -2.928 | | X | X | | | X | |
| N | | -0.68 | | | | | | |
| 1ST | 4.305 | | X | | X | | | X |
| 2ND | 3.477 | 1.24 | X | X | | | | X |
| 3RD | 2.562 | 1.36 | | X | X | | | X |
| 4TH | 1.952 | 1.31 | | X | | | X | X |
| 5TH | 1.400 | 1.39 | | | X | | X | X |
| 6TH | 1.377 | 1.02 | | X | | X | | X |
| 7TH | 1.102 | 1.25 | | | X | X | | X |
| 8TH | 1.000 | 1.10 | | | | X | X | X |
| 9TH | 0.840 | 1.19 | | | X | X | X | |
| 10TH | 0.755 | 1.11 | | X | | X | X | |
| 11TH | 0.600 | 1.26 | | X | X | X | | |

X = ON - ENGAGED CARRYING TORQUE

FIG. 3

MULTI-SPEED TRANSMISSION

CROSS-REFERENCE TO RELATED APPLICATIONS

This application claims the benefit of U.S. Provisional Application No. 61/649,659 filed May 21, 2012. The disclosure of the above application is incorporated herein by reference.

FIELD

The invention relates generally to a multiple speed transmission having a plurality of planetary gear sets and a plurality of torque transmitting devices and more particularly to a transmission having a plurality of speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Two of the planetary gear sets include first, second and third members. Two of the four planetary gear sets are stacked. The two planetary gear sets that are stacked form a planetary gear set assembly that includes a first, second, third and fourth member.

In another aspect of the present invention, the stacked planetary gear set has a member that functions as both a sun gear and a ring gear.

In still another aspect of the present invention, a first interconnecting member continuously interconnects the third member of the first planetary gear set with the first member of the second planetary gear set.

In still another aspect of the present invention, a second interconnecting member continuously interconnects the first member of the first planetary gear set with the fourth member of the planetary gear set assembly.

In still another aspect of the present invention, a first torque transmitting mechanism is selectively engageable to interconnect the second member of the second planetary gear set with the first member of the first planetary gear set and the fourth member of the planetary gear set assembly.

In still another aspect of the present invention, a second torque transmitting mechanism is selectively engageable to interconnect the third member of the second planetary gear set and the input member with the third member of the planetary gear set assembly.

In still another aspect of the present invention, a third torque transmitting mechanism is selectively engageable to interconnect the second member of the second planetary gear set with the first member of the planetary gear set assembly.

In yet another aspect of the present invention, a fourth torque transmitting mechanism is selectively engageable to interconnect the third member of the first planetary gear set and the first member of the second planetary gear set with the stationary member.

In yet another aspect of the present invention, a fifth torque transmitting mechanism is selectively engageable to interconnect the second member of the first planetary gear set with the stationary member.

In yet another aspect of the present invention, a sixth torque transmitting mechanism is selectively engageable to interconnect the third member of the planetary gear set assembly with the stationary member.

In yet another aspect of the present invention, the torque transmitting mechanisms are selectively engageable in combinations of at least three to establish a plurality of forward speed ratios and at least one reverse speed ratio between the input member and the output member.

Thus, it is an aspect of the present invention to provide a transmission having a plurality of forward speeds and at least one reverse. For example, the transmission is capable of producing ten and eleven speeds.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that the embodiments of the multi-speed automatic transmission of the present invention have an arrangement of permanent mechanical connections between the components or elements of the four planetary gear sets. A third component or element of a first planetary gear set is permanently coupled to a first component or element of the second planetary gear set and to a first component or element of a third planetary gear set. A second component or element of a first planetary gear set is permanently coupled to a second component or element of the second planetary gear set. A third component or element of a third planetary gear set is permanently coupled to first component or element of the fourth planetary gear.

Figure 1:
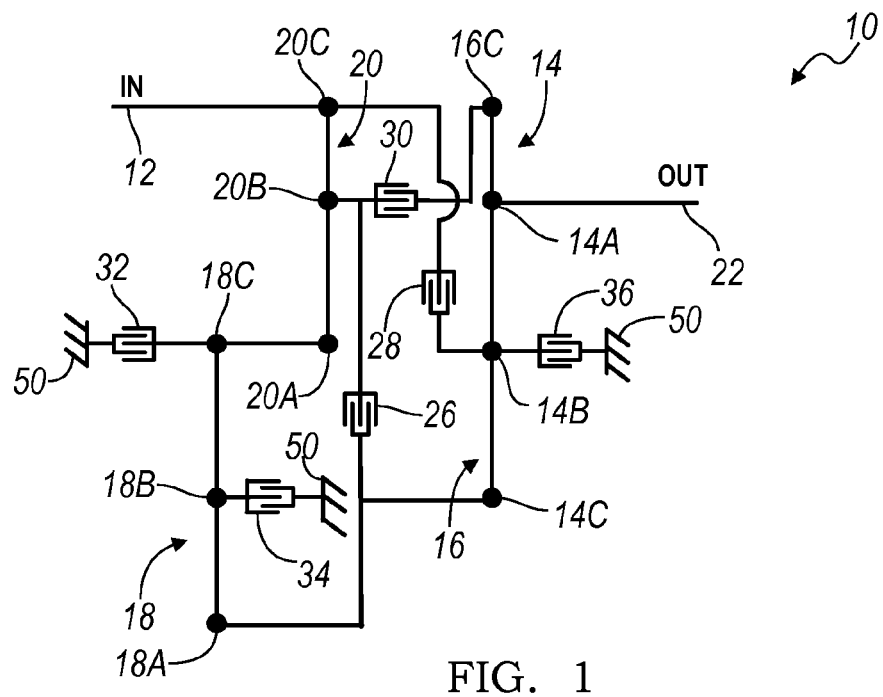
FIG. 1 is a lever diagram of an embodiment of a multi-speed transmission according to the present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20 and an output shaft or member 22. In the lever diagram of FIG. 1, the levers for the first planetary gear set 14 and the second planetary gear set 16 have been combined into a single four node lever having: a first node 16C, a second node 14A, a third node 14B, 16B and a fourth node 14C,16A. Accordingly, the second member 14B of the first planetary gear set is coupled to the second member 16B of the second planetary gear set to form the third node 14B, 16B and the third member 14C of the first planetary gear set is coupled to the first member 16A of the second planetary gear set to form the fourth node 14C,16A. The third planetary gear set 18 is illustrated as a single three node lever having: a first node 18A, a second node 18B and a third node 18C. The fourth planetary gear set 20 is illustrated as a single three node lever having: a first node 20A, a second node 20B and a third node 20C. The first node 18A of the third planetary gear set 18 is coupled to the fourth node 14C,16A of the combined levers of the first and second planetary gear sets 14, 16. The third node 18C of the third planetary gear set 18 is coupled to the first node 20A of the fourth planetary gear sets 20. The output member 22 is coupled to the second node 14A of the combined levers of the first and second planetary gear sets 14, 16. The input member 12 is coupled to the third node 20C of the fourth planetary gear sets 20.

A first clutch 26 selectively connects the first node 18A of the third planetary gear set 18 and the fourth node 14C,16A of the combined levers of the first and second planetary gear sets 14, 16 with the second node 20B of the fourth planetary gear set 20. A second clutch 28 selectively connects the third node 14B,16B of the combined levers of the first and second planetary gear sets 14, 16 with the input member or shaft 12 and the third node 20C of the fourth planetary gear sets 20. A third clutch 30 selectively connects the first node 16C of the combined levers of the first and second planetary gear sets 14, 16 with the second node 20B of the fourth planetary gear sets 20. A first brake 32 selectively connects the third node 18C of the third planetary gear set 18 and first node 20A the fourth planetary gear set 20 with a stationary member or transmission housing 50. A second brake 34 selectively connects the second node 18B of the third planetary gear set 18 with the stationary member or transmission housing 50. A third brake 36 selectively connects the third node 14B, 16B of the combined levers of the first and second planetary gear sets 14, 16 with the stationary member or transmission housing 50.

Figure 2:
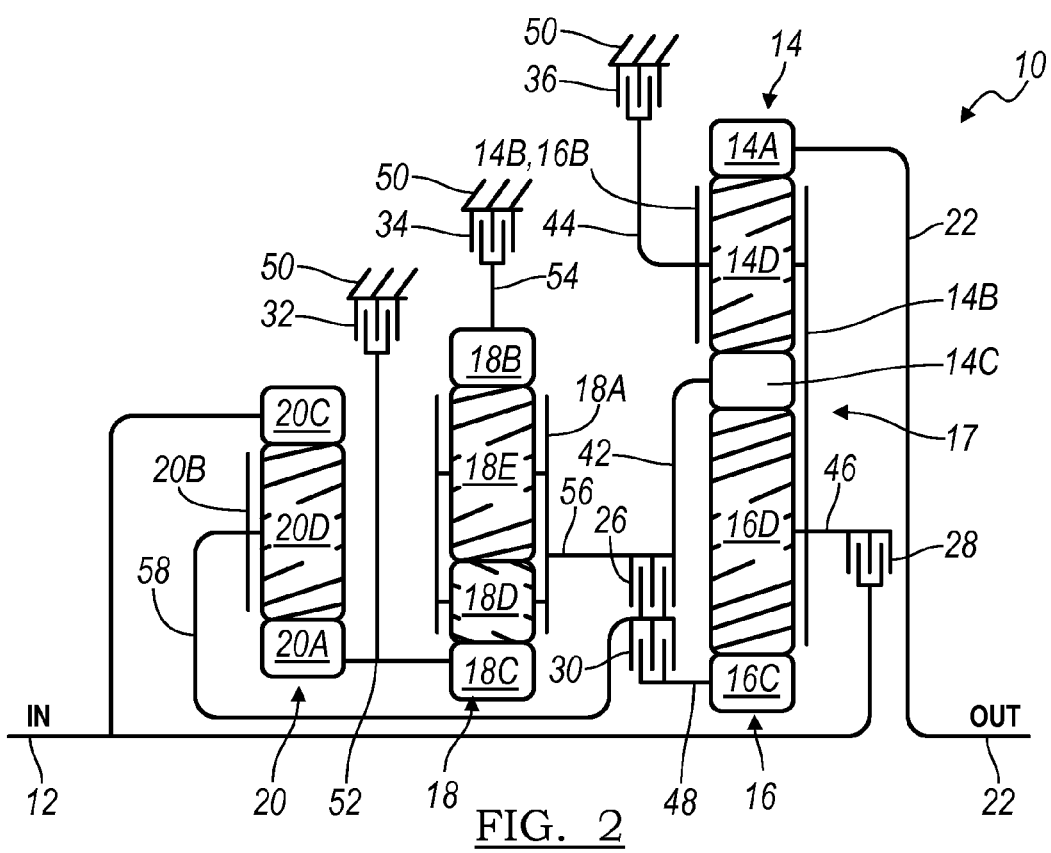
FIG. 2 is a diagrammatic illustration of an embodiment of a multi-speed transmission according to the present invention.

Referring now to FIG. 2, a stick diagram presents a schematic layout of the embodiment of the multi-speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

The planetary gear set 14 and planetary gear set 16 are arranged and interconnected to form a stacked or radially aligned planetary gear set assembly 17. As such, planetary gear set assembly 17 includes ring gear member 14A, a planet gear carrier member 14B, 16B that rotatably supports a set of planet gears 14D (only one of which is shown) and a set of planet gears 16D (only one of which is shown), a combination sun-ring gear member 14C,16A and a sun gear 16C.

In an embodiment of the present invention, the sun gear of planetary gear set 14 and the ring gear of planetary gear set 16 are formed as a single component combination sun-ring gear member 14C, 16A. Thus, with respect to planetary gear set 14 component 14C, 16A acts as a sun gear and with respect to planetary gear set 16 component 14C, 16A acts as a ring gear. The shared component 14C, 16A enables the first and second planetary gear sets 14 and 16 to be stacked or arranged radially, wherein the first planetary gear set 14 is positioned radially outward of the second planetary gear set 16 (as shown in FIG. 2).

The sun-ring gear member 14C, 16A is connected for common rotation with a first shaft or interconnecting member 42. The ring gear member 14A is connected for common rotation with the output shaft or member 22. The planet carrier member 14B, 16B is a single carrier member configured to rotatably support the planet gears 14D of planetary gear set 14 and the planet gears 16D of planetary gear set 16. Planet carrier member 14B, 16B is connected for common rotation with a second and third shafts or interconnecting members 44 and 46. The planet gears 14D are each configured to intermesh with both the ring gear member 14A and sun-ring gear member 14C, 16A. The planet gears 16D are each configured to intermesh with both the sun gear member 16C and sun-ring gear member 14C, 16A. The sun gear 16C is connected for common rotation with a fourth shaft or interconnecting member 48.

The planetary gear set 18 includes a sun gear member 18C, a ring gear member 18B and a planet gear carrier member 18A that rotatably supports a first set of planet gears 18D (only one of which is shown) and a second set of planet gears 18E (only one of which is shown). The sun gear member 18C is connected for common rotation with a fifth shaft or interconnecting member 52. The ring gear member 18B is connected for common rotation with a sixth shaft or interconnecting member 54. The planet carrier member 18A is connected for common rotation with a seventh shaft or interconnecting member 56. The first set planet gears 18D are each configured to intermesh with both the sun gear member 18C and second set planet gears 18E. The second set planet gears 18E are each configured to intermesh with both the ring gear member 18B and first set planet gears 18D.

The planetary gear set 20 includes sun gear member 20A, a ring gear member 20C and a planet gear carrier member 20B that rotatably supports a set of planet gears 20D (only one of which is shown). The sun gear member 20A is connected for common rotation with a fifth shaft or interconnecting member 52. The ring gear member 20C is connected for common rotation with the input shaft or member 12. The planet carrier member 20B is connected for common rotation with an eighth shaft or interconnecting member 58. The planet gears 20D are each configured to intermesh with both the sun gear member 20A and the ring gear member 20C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30 and first brake 32, second brake 34 and third brake 36 allow for selective interconnection of the shafts or interconnecting members, members of the planetary gear sets and the housing. For example, the first clutch 26 is selectively engageable to connect the first shaft or interconnecting member 42 and seventh shaft or interconnecting member 56 with the eighth shaft or interconnecting member 58. The second clutch 28 is selectively engageable to connect the input shaft or member 12 with the third shaft or interconnecting member 46. The third clutch 30 is selectively engageable to connect the fourth shaft or interconnecting member 48 with the eighth shaft or interconnecting member 58. The first brake 32 is selectively engageable to connect the fifth shaft or interconnecting member 52 with the stationary element or the transmission housing 50 in order to restrict the member 52 from rotating relative to the transmission housing 50. The second brake 34 is selectively engageable to connect the sixth shaft or interconnecting member 54 with the stationary element or the transmission housing 50 in order to restrict the member 54 from rotating relative to the transmission housing 50. The third brake 36 is selectively engageable to connect the second shaft or interconnecting member 44 with the stationary element or the transmission housing 50 in order to restrict the member 44 from rotating relative to the transmission housing 50.

Referring now to FIG. 2 and FIG. 3, the operation of the embodiment of the multi-speed transmission 10 will be described. It will be appreciated that transmission 10 is capable of transmitting torque from the input shaft or member 12 to the output shaft or member 22 in a plurality of forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34 and third brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, first clutch 26, second brake 34 and third brake 36 are engaged or activated. The first clutch 26 connects the first shaft or interconnecting member 42 and seventh shaft or interconnecting member 56 with the eighth shaft or interconnecting member 58. The second brake 34 connects the sixth shaft or interconnecting member 54 with the stationary element or the transmission housing 50 in order to restrict the member 54 from rotating relative to the transmission housing 50. The third brake 36 connects the second shaft or interconnecting member 44 with the stationary element or the transmission housing 50 in order to restrict the member 44 from rotating relative to the transmission housing 50. Likewise, the plurality of forward ratios are achieved through different combinations of clutch and brake engagement, as shown in FIG. 3.

In an alternate embodiment, a reverse gear is established by selectively engaging first clutch 26, first brake 32 and third brake 36. The first clutch 26 connects the first shaft or interconnecting member 42 and seventh shaft or interconnecting member 56 with the eighth shaft or interconnecting member 58. The first brake 32 connects the fifth shaft or interconnecting member 52 with the stationary element or the transmission housing 50 in order to restrict the member 52 from rotating relative to the transmission housing 50. The third brake 36 connects the second shaft or interconnecting member 44 with the stationary element or the transmission housing 50 in order to restrict the member 44 from rotating relative to the transmission housing 50.

It will be appreciated that the foregoing explanation of operation and gear states of the multi-speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
    an input member;
    an output member;
    a first planetary gear set having a first, a second and a third member;
    a second planetary gear set having a first, a second and a third member;
    a planetary gear set assembly having a first member, a second member, a third member, fourth member, and a first and a second set of pinion gears rotatably supported by one of the first, second, third, and fourth members of the planetary gear set assembly and wherein the first and second set of pinion gears each intermesh with another one of the first, second, third, and fourth members of the planetary gear set assembly;
    a first interconnecting member continuously interconnecting the third member of the first planetary gear set with the first member of the second planetary gear set;
    a second interconnecting member continuously interconnecting the first member of the first planetary gear set with the fourth member of the planetary gear set assembly; and
    at least six torque transmitting mechanisms selectively engageable to interconnect at least one of the first, second, third and fourth members of the planetary gear set assembly and at least one of the first, second and third members of the first and second planetary gear sets with at least one other of first, second, third and fourth members of the planetary gear set assembly, the first, second and third members of the first and second planetary gear sets and a stationary member, and wherein the at least six torque transmitting mechanisms are selectively engageable to establish a plurality of forward speed ratios and at least one reverse speed ratio between the input member and the output member.

2. The transmission of claim 1 wherein a first of the six torque transmitting devices is selectively engageable to interconnect the second member of the second planetary gear set with the first member of the first planetary gear set and the fourth member of the planetary gear set assembly.

3. The transmission of claim 2 wherein a second of the six torque transmitting devices is selectively engageable to interconnect the third member of the second planetary gear set and the input member with the third member of the planetary gear set assembly.

4. The transmission of claim 3 wherein a third of the six torque transmitting devices is selectively engageable to interconnect the second member of the second planetary gear set with the first member of the planetary gear set assembly.

5. The transmission of claim 4 wherein a fourth of the six torque transmitting devices is selectively engageable to interconnect the third member of the first planetary gear set and the first member of the second planetary gear set with the stationary member.

6. The transmission of claim 5 wherein a fifth of the six torque transmitting devices is selectively engageable to interconnect the second member of the first planetary gear set with the stationary member.

7. The transmission of claim 6 wherein a sixth of the six torque transmitting devices is selectively engageable to interconnect the third member of the planetary gear set assembly with the stationary member.

8. The transmission of claim 1 wherein the first planetary gear set is disposed between the second planetary gear set and the planetary gear set assembly.

9. The transmission of claim 1 wherein the third member of the first planetary gear set, the first member of the second planetary gear set, the first member of the planetary gear set assembly are sun gears, the first member of the first planetary gear set, the second member of the second planetary gear set, the third member of the planetary gear set assembly are carrier members and the second member of the first planetary gear set, third member of the second planetary gear set, the second member of the planetary gear set assembly are ring gears, wherein the carrier member of the first planetary gear set rotatable supports a first and second set of planet pinions and wherein the first set of planet pinions mesh with the sun gear and the second set of planet pinions and the second set of planet pinions mesh with the ring gear and the first set of planet pinions.

10. The transmission of claim 9 wherein the fourth member of the planetary gear set assembly is a gear having an outer surface and an inner surface, wherein the outer surface has a plurality of gear teeth and the inner surface has a plurality of gear teeth.

11. The transmission of claim 10 wherein the fourth member of the planetary gear set assembly meshes with the first plurality of pinion gears rotatably supported by the third member of the planetary gear set assembly and with the second plurality of pinion gears rotatably supported by the third member of the planetary gear set assembly.

12. The transmission of claim 1 wherein input member is continuously interconnected with the third member of the second planetary gear set.

13. The transmission of claim 1 wherein output member is continuously interconnected with the second member of the planetary gear set assembly.

14. The transmission of claim 1 wherein the stationary member is a transmission housing.

15. A transmission comprising:
an input member;
an output member;
a first planetary gear set having a first, a second and a third member;
a second planetary gear set having a first, a second and a third member;
a planetary gear set assembly having a first member, a second member, a third member and a fourth member;
a first interconnecting member continuously interconnecting the third member of the first planetary gear set with the first member of the second planetary gear set;
a second interconnecting member continuously interconnecting the first member of the first planetary gear set with the fourth member of the planetary gear set assembly;
a first torque transmitting mechanism selectively engageable to interconnect the second member of the second planetary gear set with the first member of the first planetary gear set and the fourth member of the planetary gear set assembly;
a second torque transmitting mechanism selectively engageable to interconnect the third member of the second planetary gear set and the input member with the third member of the planetary gear set assembly;
a third torque transmitting mechanism selectively engageable to interconnect the second member of the second planetary gear set with the first member of the planetary gear set assembly;
a fourth torque transmitting mechanism selectively engageable to interconnect the third member of the first planetary gear set and the first member of the second planetary gear set with the stationary member;
a fifth torque transmitting mechanism selectively engageable to interconnect the second member of the first planetary gear set with the stationary member; and
a sixth torque transmitting mechanism selectively engageable to interconnect the third member of the planetary gear set assembly with the stationary member, and
wherein the torque transmitting mechanisms are selectively engageable to establish a plurality of forward speed ratios and at least one reverse speed ratio between the input member and the output member.

16. The transmission of claim 15 wherein the fourth member of the planetary gear set assembly is a gear having an outer surface and an inner surface, wherein the outer surface has a plurality of gear teeth and the inner surface has a plurality of gear teeth.

17. The transmission of claim 16 wherein the fourth member of the planetary gear set assembly meshes with a first plurality of planet pinion gears rotatably supported by the third member of the planetary gear set assembly and with a second plurality of planet pinion gears rotatably supported by the third member of the planetary gear set assembly.

18. The transmission of claim 17 wherein the third member of the first planetary gear set, the first member of the second planetary gear set, the first member of the planetary gear set assembly are sun gears, the first member of the first planetary gear set, the second member of the second planetary gear set, the third member of the planetary gear set assembly are carrier members and the second member of the first planetary gear set, third member of the second planetary gear set, the second member of the planetary gear set assembly are ring gears, wherein the carrier member of the first planetary gear set rotatable supports a first and second set of planet pinions and wherein the first set of planet pinions mesh with the sun gear and the second set of planet pinions and the second set of planet pinions mesh with the ring gear and the first set of planet pinions.

19. The transmission of claim 15 wherein the output member is continuously interconnected with the second member of the planetary gear set assembly.

\* \* \* \* \*